Oct. 7, 1952     A. R. MAIER     2,613,054

PUMP VALVE

Filed July 8, 1948

Inventor:
AUGUST R. MAIER,
by: Donald G. Dalton
his Attorney.

Patented Oct. 7, 1952

2,613,054

UNITED STATES PATENT OFFICE 2,613,054

PUMP VALVE

August R. Maier, Dallas, Tex., assignor to United States Steel Company, a corporation of New Jersey Application July 8, 1948, Serial No. 37,629

1 Claim. (Cl. 251—27)

This invention relates to improvements in high pressure pump valves, such as those used in slush pumps for well drilling.

An object of the invention is to provide improved high pressure valves which have minimum areas of machined metal-to-metal contact without sacrificing quality or durability of the valve, thereby promoting manufacturing economy.

A further object of the invention is to provide improved high pressure valves having combined metal and rubber disks in which the means fixing the rubber section of the disk to the metal section is of a critical design that furnishes the best wearing and sealing characteristics.

A further object of the invention is to provide improved high pressure valves having combined metal and rubber disks in which the disks are held assembled by plates and nuts that bear directly against the metal section of the disk and compress the rubber section, without relying on stresses through the latter for holding the parts assembled.

Figure 1:
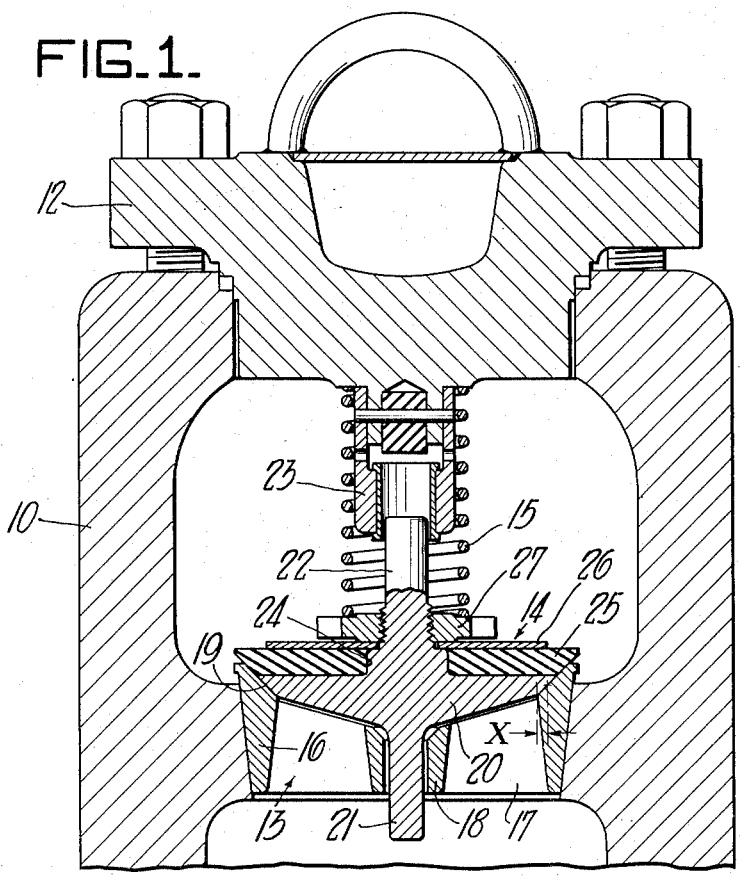
Figure 2:
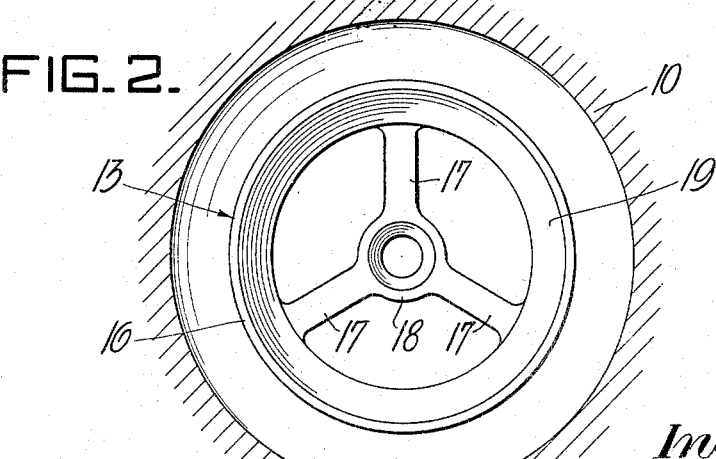

In accomplishing these and other objects of the invention I have provided improved details of structure, a preferred form of which is shown in the accompanying drawing, in which:

Figure 1 is a vertical sectional view of an improved valve embodying features of the present invention; and Figure 2 is a top plan view of the valve seat.

Referring more in detail to the drawing:

There is shown at 10 a pump valve body which has a cap 12. The valve may be either a discharge valve or an intake valve, since both valves commonly are identical. A valve seat member 13 is fixed in said body. A valve disk 14 is supported in said body for reciprocable movement to open and close the valve passage, being urged to closed position by a spring 15.

In accordance with the present invention the seat member includes an outer ring 16, radial ribs 17 and a central bushing 18, all formed as an integral casting. Outer ring 16 has a flaring circumferential face 19, which forms the actual valve seat. This face must be machined to close tolerances. The upper faces of ribs 16 slope at an angle less than the seat and furnish a medial support for the valve disk, which flexes somewhat under the high pressures to which the valve is subjected. The upper faces of the ribs are not machined, but initially clear the bottom of the valve disk. As the valve is used, the seat and disk wear slightly until the disk engages the ribs. Continued use of the valve wears the contacting surfaces until a close fit is established.

Also in accordance with the present invention, valve disk 14 includes a metal section 20, which has integral stems 21 and 22. Said stems are slidably received respectively in guide bushing 18 and in a guide bushing 23 carried by valve cap 12. Section 20 has an integral shoulder 24 at the foot of stem 22 and this stem has a threaded section immediately above said shoulder. The outer circumferential face of the metal section flares at an angle complementary to the flare of the seat, but is of somewhat less height. This face must be machined to close tolerances and is cooperable with the seat to close the valve passage. The lower face of section 20, which is supported on ribs 17, is not machined.

A rubber section 25 is superposed on the upper face of section 20 and initially is of slightly greater height than shoulder 24. The outer circumferential face of the rubber section forms a continuation of that of metal section 20 and flares at the same angle. This face also cooperates with the valve seat, the combination of metal-to-metal and rubber-to-metal contacts sealing the valve, as known in the art.

The rubber section is retained on the metal section by a plate 26 and a nut 27. Plate 26 bears directly on shoulder 24, and the plate and nut compress the rubber section sufficiently to fix it firmly in place. Thus the disk parts are held assembled through metal-to-metal engagement between nut 27, plate 26 and shoulder 24, and there is no chance of their loosening through subsequent distortion of the rubber section.

As already stated, the metal-to-metal contacting surfaces of the disk and seat wear in preliminary to engagement of the medial portion of the disk with rib 17. At the same time the contacting face of the rubber section does not wear, but instead the outer circumferential region of the rubber section flexes upwardly. In order that this flexure may be of a magnitude to maintain a proper seal and yet not so great as to damage the rubber, the extent of the free circumferential region is critical. The extent of free region is determined by the position of the circumference of plate 26, and hence this position also is critical. I find the best results are obtained when the plate circumference projected downwardly to the flaring face of metal section 20 lies approximately midway of this face, as indicated at X (Figure 1).

From the foregoing description, it is seen that I have provided a high pressure valve in which only two relatively small surfaces need be machined to close tolerances and yet a firm metal-to-metal support is furnished for the medial portion of the valve disk. The circumferential region of the rubber section is free to flex the amount which furnishes the best seal as the metal surfaces wear. The disk parts are held assembled by metal-to-metal contacts without reliance on the rubber for this purpose.

I intend the term "rubber" as used throughout the specification and claim to be construed in its generic sense, that is, as including various synthetic materials and plastics that are suitable for the purpose.

While I have shown and described only a single embodiment of the invention, it is apparent that modifications may arise. Therefore, I do not wish to be limited to the disclosure set forth, but only by the scope of the appended claim.

I claim:

In a high pressure pump valve, a body, a seat member fixed in said body, and a disk supported for reciprocable movement in said body, said seat member having an upwardly directed flared machined circumferential face and including central ribs having upwardly directed unmachined faces, said unmachined faces being at a smaller angle from the horizontal than said circumferential face, said disk including a metal section having a downwardly directed flared machined circumferential face and an unmachined bottom face in its medial portion, the unmachined face of said disk section being spaced closely above the unmachined faces of said ribs, a rubber section superposed on said metal section and having a downwardly directed flared circumferential face forming a continuation of that on said metal section, the angle of flare of the circumferential faces on said disk sections being complementary to that of the circumferential face of said seat sections so that these faces can engage for closing the valve, the upper face of said metal section having a central shoulder and a screw-threaded stem upstanding from said shoulder, said rubber section having upper and lower faces which are flat throughout and being received around said shoulder, a retaining plate having a flat underface which bears directly against the upper face of said rubber section and said shoulder, and a nut threadedly engaged with said stem and bearing against the upper face of said retaining plate, the projection of the circumference of said retaining plate downwardly lying approximately midway of the flared face of said metal section.

AUGUST R. MAIER.

REFERENCES CITED

The following references are of record in the file of this patent:

UNITED STATES PATENTS

| Number | Name | Date |
|---|---|---|
| 1,785,278 | MacClatchie | Dec. 16, 1930 |
| 1,949,874 | Paterson | Mar. 6, 1934 |
| 1,963,684 | Shimer | June 19, 1934 |
| 2,093,662 | Steirly | Sept. 21, 1937 |
| 2,223,651 | White | Dec. 3, 1940 |